United States Patent [19]

Fidelman

[11] Patent Number: 4,904,840
[45] Date of Patent: Feb. 27, 1990

[54] AUGER FLIGHT WELDER

[76] Inventor: David Fidelman, 5445 W. Plymouth Dr., Littleton, Colo. 80123

[21] Appl. No.: 242,619

[22] Filed: Sep. 9, 1988

[51] Int. Cl.[4] .............................................. B23K 9/04
[52] U.S. Cl. .......................... 219/124.34; 219/76.14; 219/77; 219/125.11
[58] Field of Search ...................... 219/76.1, 76.14, 77, 219/124.22, 124.34, 125.1, 125.11

[56] References Cited

U.S. PATENT DOCUMENTS

| | | | |
|---|---|---|---|
| 1,453,026 | 4/1923 | Smith | 219/125.1 |
| 2,440,696 | 5/1948 | Patterson | 219/124.22 |
| 2,441,507 | 5/1948 | Peters | 219/124.22 |
| 2,504,921 | 4/1950 | Carter | 219/124.34 |
| 3,119,009 | 1/1964 | Zeller | 219/125.1 |

FOREIGN PATENT DOCUMENTS 215720 11/1984 Fed. Rep. of Germany ..... 219/76.1

Primary Examiner—Clifford C. Shaw
Attorney, Agent, or Firm—Charles C. Corbin

[57] ABSTRACT

An apparatus for rebuilding the worn outermost edge of a flight of an auger section by depositing a continuous bead of weld material along the extent of that edge. Attached to a support frame is chuck means for releasably grasping opposite ends of the auger section and holding it horizontally so that it may be driven in rotation about its longitudinal axis, and a guide rail affixed to the frame to extend above and parallel to the auger axis. A carriage assembly is mounted to move freely along the rail and includes a carriage plate mounted for vertical movement; which plate has a follower wheel with a grooved rim, mounted to its lower end. This wheel is adapted to ride an upper portion of the auger flight and to thereby vertically support the carriage plate and to urge it in horizontal movement as the auger is rotated. The carriage plate also adjustably mounts the welding head of an arc-welder including an automatically fed welding wire that is aligned with the flight edge. This arrangement allows the welding head to deposit a continuous bead along the flight edge as the auger section is rotated.

14 Claims, 4 Drawing Sheets

AUGER FLIGHT WELDER

BACKGROUND

Augers for earth drilling have vanes or flights that are helically arranged and affixed to a tubular or solid metal shank. Typically, augers are provided in about 5 to 6 feet long sections which are connectable in tandem by their male and female connecting ends to provide for drilling to various depths. With use, the outer edges of an auger flight will inevitably wear, resulting in a decrease in effective diameter of the auger. This can result in a significant decrease in drilling efficiency and effectiveness; thus there is a need to periodically restore the flight edges. The typical way of doing this is to lay an auger section on a flat surface and to use an arc-welder to manually weld the flight edges as the auger is intermittently rolled along the surface. This commonly results in an uneven, inconsistent weld deposit, and is a tedious, time-consuming and potentially hazardous process. There will also tend to occur significant variation in the weld bead according to who does the welding.

SUMMARY OF THE INVENTION

In view of the foregoing it is a principal object of the present invention to provide means by which a smooth, even, continuous bead of weld metal is deposited along the outer edge of an auger flight.

Another object is to provide apparatus for accomplishing the foregoing object quickly and safely.

A further object of the invention is to provide welding apparatus for restoring the flight edges of a variety of auger types and sizes.

These and other objects will be recognized, and are achievable by those of ordinary skill in the art by reference to the present invention as described in the following summary, detailed description and claims.

Accordingly the present invention provides automatic welding apparatus for depositing a continuous bead of weld material along the outer edge of the flight of an auger section. The inventive apparatus includes a main support frame to which is attached at horizontally spaced locations a first and a second gripper element for releasably grasping opposite ends of the auger section, and for mounting the section horizontally for rotation about its longitudinal axis. There is drive means connected to the first gripper element for rotating the mounted auger section. Means for supporting the second gripper element is adapted to exert a spring-generated holding force in a horizontal direction across the mounted auger section and to provide a conductive path through the gripper element to a grounded nonrotatable portion of the support structure. Also mounted to the main support frame is a guide rail disposed above the mounted auger section and extending parallel to the rotational axis of the auger section. The invention features a carriage assembly including a traveller mounted to the guide rail to move freely horizontally therealong. The carriage assembly also includes a carriage plate mounted to the traveller for free, guided movement in a vertical direction. A freeturning follower wheel, having a grooved rim, is mounted to the base of the carriage plate with the grooved rim engaging the edge portion of the auger flight at a location near the top of the flight, and thus vertically supporting the carriage plate. The follower wheel will cooperate with the flight of a revolving auger to urge the carriage assembly laterally along the guide rail. Reversing the rotation of the auger will reverse the lateral movement of the carriage assembly. The wire fed welding head of an arc-welder is also mounted to the carriage plate and has a wire welding tip held in alignment with the edge of the auger flight.

DETAILED DESCRIPTION

Figures 1, 2:
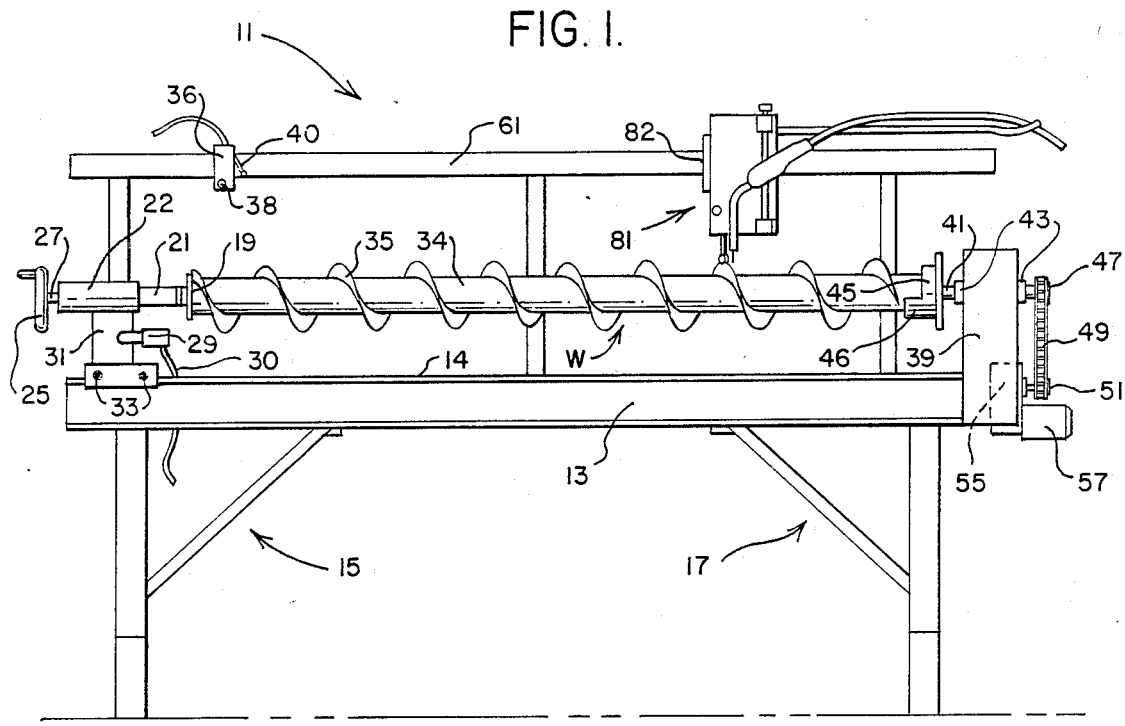
FIG. 1 is a side elevational view of a flight edge welding machine constructed according to the intention.
FIG. 2 is a rear view in perspective, with some components removed for sake of clarity, of a welding apparatus according to the invention.
Figure 10:
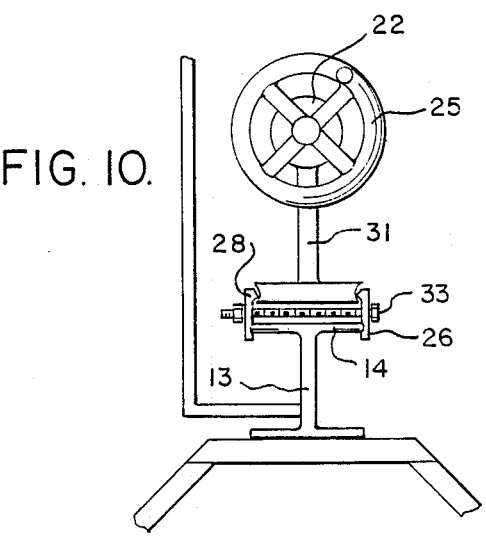
FIG. 10 is an enlarged partial end view of the inventive apparatus.

Referring now to the drawings, FIG. 1 depicts an automatic auger flight welding device 11 constructed as a preferred embodiment of the invention. The basic support structure is provided by a beam frame 13 which is horizontally supported by front and rear leg assemblies 15 and 17 respectively. A gripper element 19 is affixed to shaft 21 which is telescopically mounted in the tubular housing 22 of tailstock assembly 23. Shaft 21 is longitudinally adjustable by the rotating of wheel handle 25 on shaft 27, in a manner to be described in greater detail hereinafter. Assembly 23 is affixed to support bracket 31 which is slidably attached to the upper flange 14 of frame 13. Bracket 31 may be secured rigidly at any adjustment in which it is slidingly placed, by the tightening of clamping bolts 33. FIG. 10 best shows the construction by which the tightening of bolts 33 will draw the opposed clamping plates 26 and 28 into clamping engagement with the flange 14 and the base of support bracket 31. Assembly 23 also includes brush means for maintaining electric conductance between the non-rotating shaft 21 and the rotatable gripper element 19, and means for allowing for longitudinal heat expansion, both of which will be described in greater detail hereinafter. An upright support 39 is rigidly affixed to the other end of frame 13. A shaft 41 is rotatively journalled in two spaced bearings 43 mounted on support 39 and is in axial alignment with the shaft 21. A gripper element 45, somewhat complementary to gripper element 19, is attached to one end of shaft 41 and will cooperate with gripper element 19 to grasp opposite ends of a work piece W and support it for rotation. The work piece herein shown comprises a typical earth drilling auger section having a tubular stem 34 around which lies a single spiral flight 35 that has a worn outer edge in need of rebuilding. The opposite ends of stem 34 have male and female adaptions of known construction by which a plurality of auger sections may be releasably interconnected in tandem to form a single drilling auger of the desired length. It should be evident to those of ordinary skill in the art that gripper elements 19 and 45 may be of other forms or construction adapted to engage the opposite ends of a variety of auger sections. This includes augers of different sizes, with tubular or solid stems, as well as auger having various known designs of male/female interlocking ends. That is, any type of gripper or chuck devices for rotatably supporting an auger work piece may be employed without departing from the invention.

The other end of shaft 41 mounts a sprocket wheel 47 which is engaged by drive chain 49 which is in turn driven by a sprocket wheel 51. As FIG. 1 shows the sprocket 51 is attached to the output shaft 53 of a conventional speed transfer box 55. A reversible electric motor 57 connects to the input of the speed transfer box 55 thus completing the drive chain assembly for rotating the gripper element 45. As FIGS. 1 and 2 show, the invention utilizes a guide rail 61 with top and bottom edges 63 and 65 respectively, which extend parallel to the rotational axes of gripper elements 19 and 45. Rail 61 is rigidly supported by a rack of welded channel stock which includes lower bars 71 that are affixed to frame 13 at locations 73, and upper bars 75 that are welded to the guide rail 61 at spaced locations 77.

Figure 4:
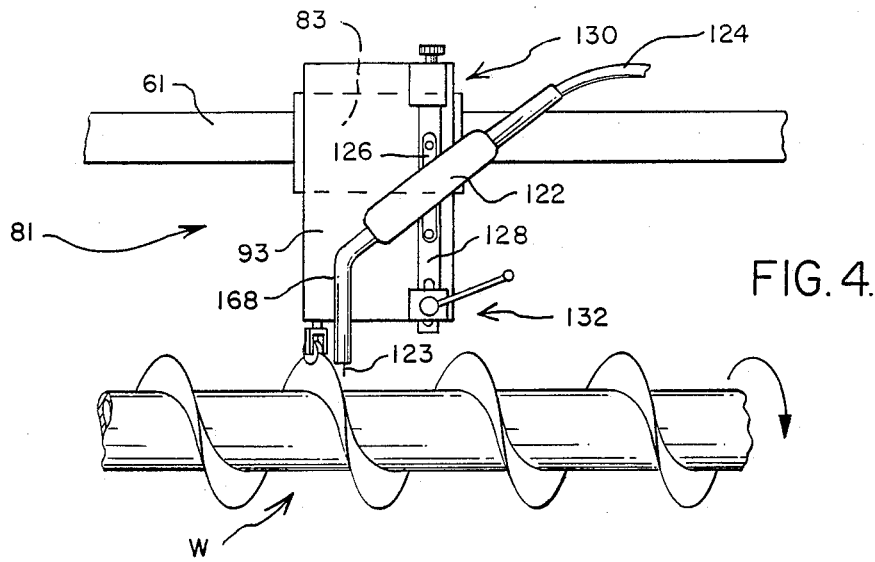
FIG. 4 is an enlarged partial front view showing the carriage assembly.
Figure 3:
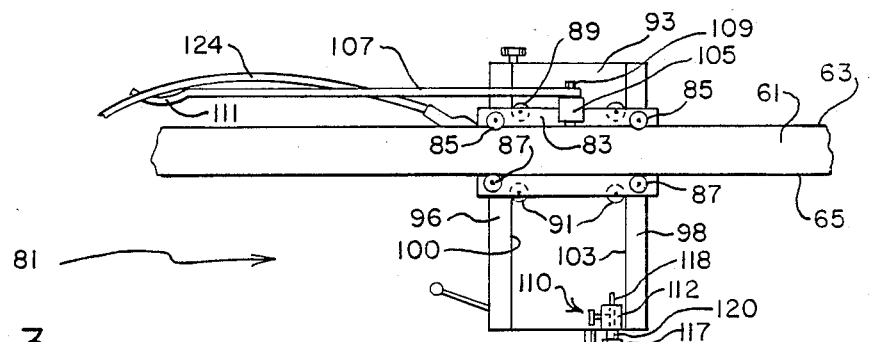
FIG. 3 is an enlarged partial rear elevational view showing the carriage assembly.
Figure 5:
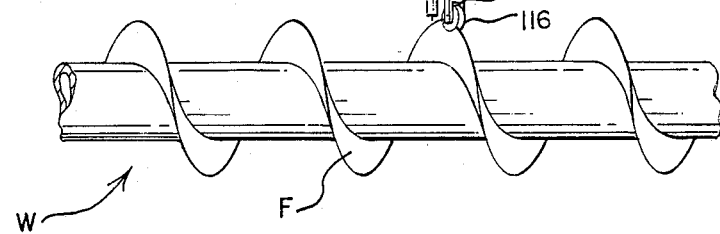
FIG. 5 is an enlarged partial top view of the carriage assembly.
Figure 5:
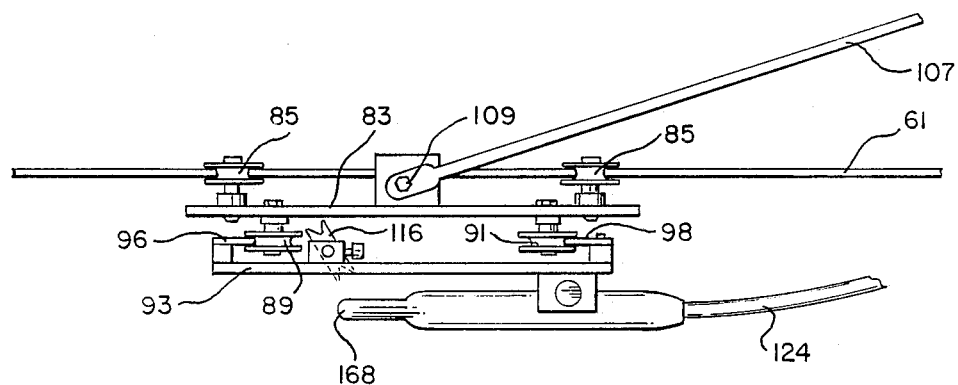

As best shown in FIGS. 3, 4 and 5 the invention features a carriage assembly 81 which includes a traveller plate 83 that mounts free-rotating, groove-rimmed top wheels 85 and bottom wheels 87 that are spaced so as to rollingly embrace the rail at its top and bottom edges 63 and 65 respectively. Thus traveller plate 83 is mounted to be held fairly rigidly in a vertical plane yet is free to move horizontally on rail 61. Mounted to the opposite side of traveller plate 83 are free-turning upper wheels 89 and similar lower wheels 91. The carriage assembly 81 also features a carriage plate 93 that has spaced from its rear surface the vertically extending rails 96 and 98, with horizontally spaced opposing edges 100 and 103. The traveller wheels 89 and 91 snugly engage the carriage rail edges 100 and 103 respectively to hold the carriage plate 93 fairly rigidly in a vertical plane while guiding it in free vertical movement. A block 105 is attached to the upper part of traveller plate 83 and one end of a cable support arm 107 is affixed thereto by bolt 109. The other end of arm 107 has a cradle portion 111 adapted to support a portion of a welding cable 124.

FIG. 3 shows the follower mechanism 110 which performs a flight engaging and following function as well as vertically supporting the carriage plate 93. There is a mounting block 112 affixed to carriage plate 93, which block mounts a locking screw 114 and has a vertical bore therethrough. A free-turning follower wheel 116, having a grooved rim, is mounted for rotation in the clevis 117 which has upright stem 118 that is rotationally received in the bore of block 112. A collar portion 120 makes load bearing engagement with the bottom of block 112. The configuration of the groove of the grooved rim of wheel 116 is such that both sides of an edge portion of flight F are embraced, with little lateral play therebetween. This ensures that the follower wheel 116 will cooperate with flight F to allow the direction of propulsion of carriage assembly 81 to be reversed, as required, by reversing the rotation of the work piece. The wheel 116 may be secured in the orientation that aligns with the angle of pitch of the flight F of a work piece by tightening screw 114 which will hold stem 118 against rotation.

Figure 11:
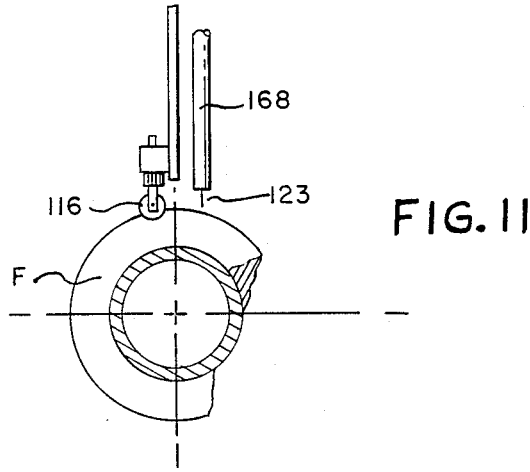
FIG. 11 is a partial view illustrating the alignment of follower wheel and welding electrode.

As FIG. 11 illustrates, the aforedescribed construction is adapted to hold wheel 116 in engagement with flight F near its apex, and to rollingly support the entire weight of carriage plate 93 and all of any attachments thereto.

Device 11 incorporates a welding head 122 of a wirefed, gas-shielded arc welder of a type well known in the industry. The associated ground cable 30 is shown in FIG. 1 to be preferably attached to bracket 31 by clamp 29. The wire feed and power cord 124 is preferably supported away from interfering contact with parts of unit 11 by the cradle 111 of the cable support bar 107. As FIG. 4 indicates a wire electrode 123 extends through the barrel 168 of welding head 122 from a coil of wire (not shown) and will be automatically played out at a speed equal to that at which it will be consumed. The welding head 122 includes a mounting bracket 126 by which it is bolted to an adjustable support bar 128.

Figure 6:
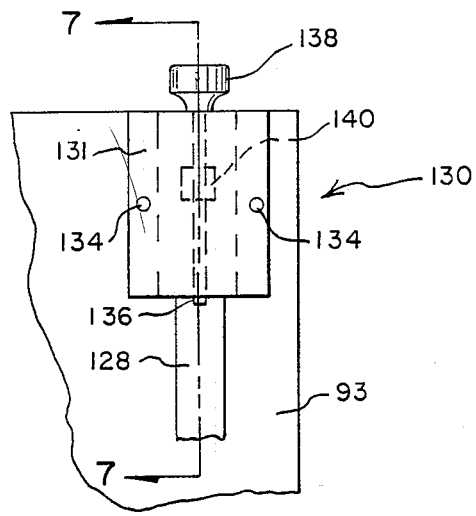
FIG. 6 is an enlarged partial view of vertical adjust mechanism for the welding head.
Figure 7:
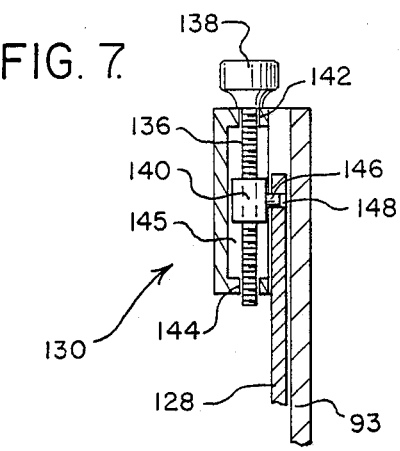
FIG. 7 is a partial sectional view taken along the line 7—7 of FIG. 6.

The upper portion of bar 128 is mounted within a vertical adjust mechanism 130 and its lower end is mounted in a mechanism 132 for controlling lateral movement of that end of bar 128. FIGS. 6 and 7 show that the vertical adjust mechanism 130 includes mounting block 131 which is secured to carriage plate 93 by bolts 134, a jack screw 136 with attached knurled knob 138, and travelling thrust nut 140. Top and bottom ends of jack screw 137 are journalled in bores 142 and 144 respectively. The nut 140 which resides in a slot 145 and which threadedly receives screw 136 in vertical drive relationship, has a cylindrical stub 146 which engages the hole 148 at the upper end of bar 128. Thus by turning knob 138 the bar 128 is vertically adjustable.

Figure 8:
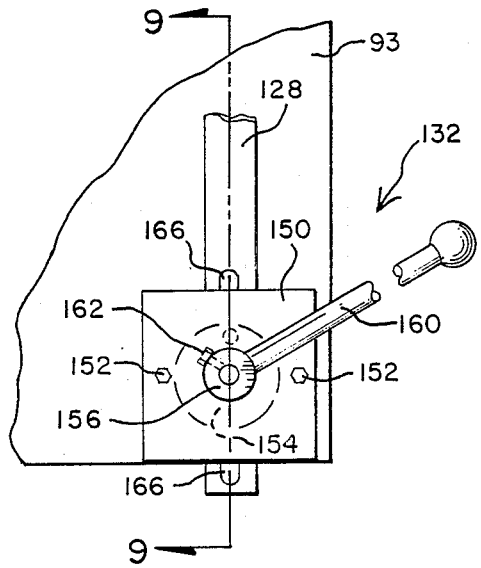
FIG. 8 is an enlarged partial front elevational view showing the lateral adjust mechanism for the welding head.
Figure 9:
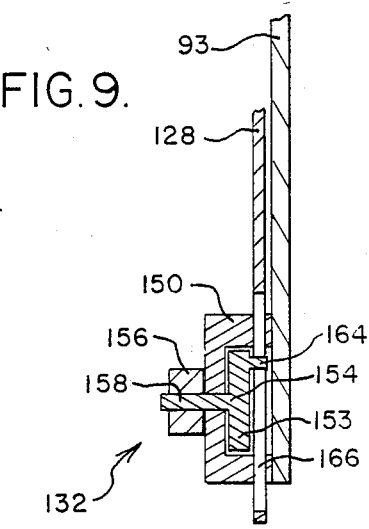
FIG. 9 is a partial cross-sectional view taken along the line 9-8 of FIG. 8.

In FIGS. 8 and 9 the adjust mechanism 132 is shown to include a mounting block 150 that is affixed to carriage plate 93 by bolts 152, a crank 154, and a hub 156. As FIG. 9 shows the crank 154 has circular potion 153 mounted in a circular cavity in block 150, and has shaft 158 that passes through hole 159. The hub 156 of a lever arm 160 receives and is secured to shaft 158 by locking screw 162. A cylindrical stub 164, which depends from crank portion 153 is received within a vertical slot 166 in the lower portion of bar 128. It can be seen that rotation of lever 160 will turn crank 154 which causes stub 164 to urge the lower end of bar 128 to move to the left or right as viewed in FIG. 8. When carriage assembly 81 is in operative position with follower wheel 116 engaging flight F, the tip of the wire electrode 123 may be brought into proper alignment with the edge of flight F by appropriately manipulating the aforedescribed mechanisms 130 and 132.

Figure 12:
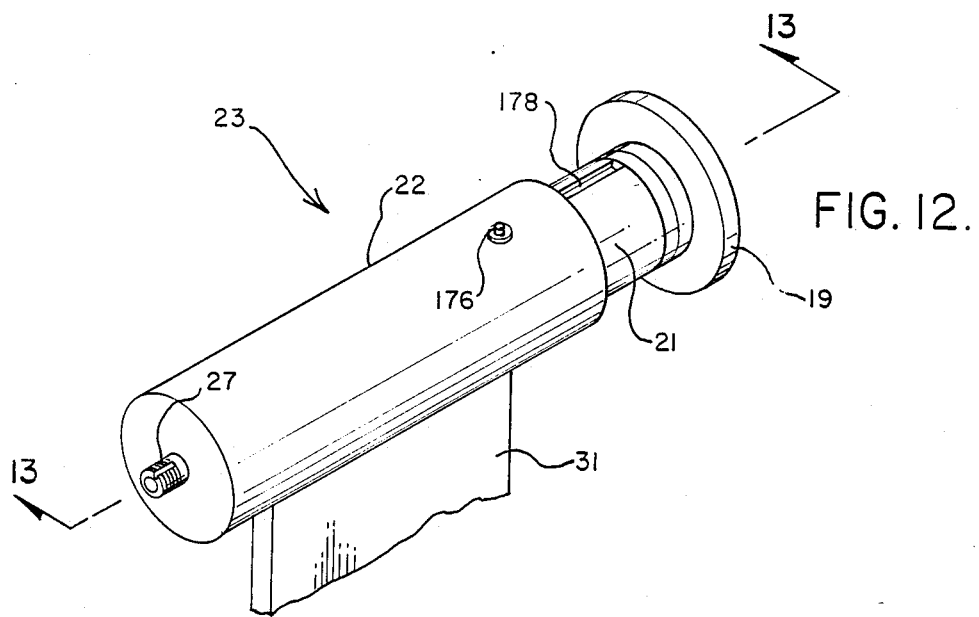
FIG. 12 is an enlarged partial isometric view showing tailstock assembly 23.
Figure 13:
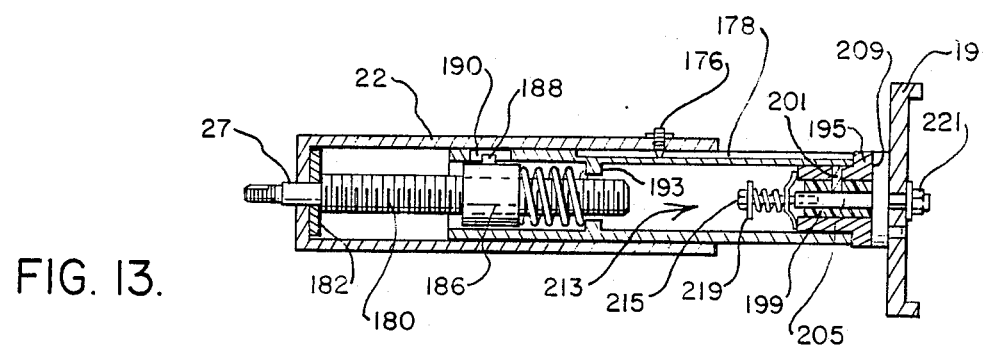
FIG. 13 is a sectional view taken along the line 13—13 of FIG. 12.
Figure 14:
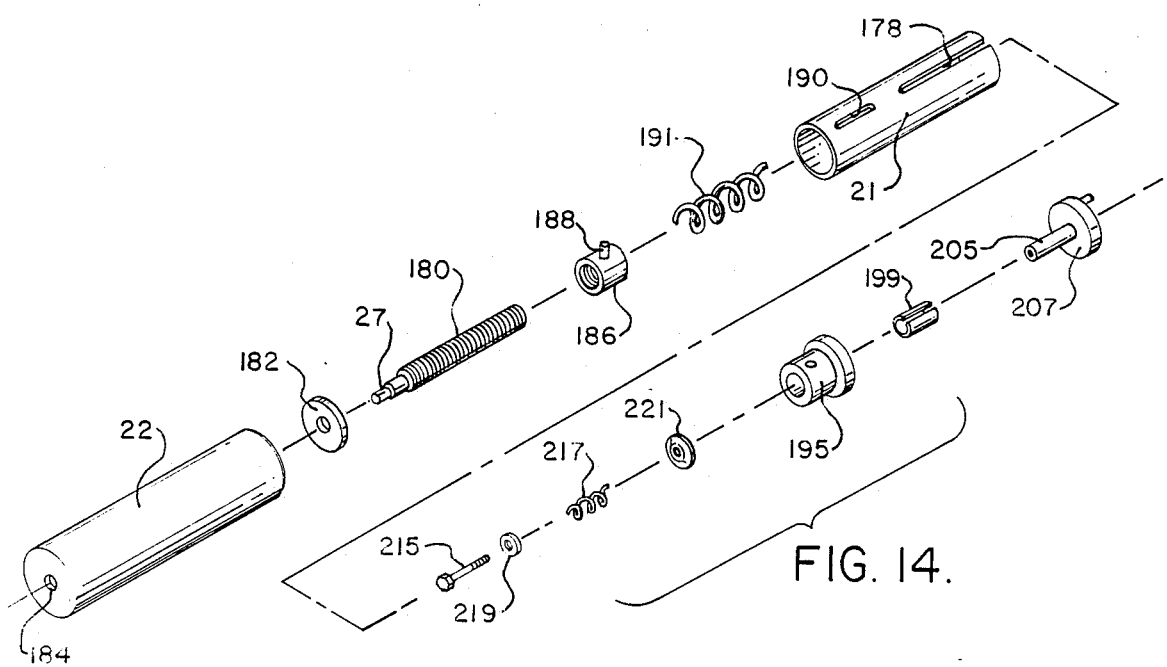
FIG. 14 is an exploded view of the tailstock assembly.

FIGS. 12 through 14 show the preferred construction of the tailstock assembly 23. Tubular shaft 21 resides in tubular housing 22 with a guide screw 176 lying in a slot 178 of tubular shaft 21 so as to allow sliding axial movement while retaining shaft 21 against rotation. The shaft 27 mounts a thrust washer 182 and is received through hole 184 of housing 22. The wheel handle 25 is mountable to shaft 27 in a conventional manner. The threaded extension 180 of shaft 27 is embraced by a thrust nut 186 which mounts in one end portion of tubular shaft 21 for axial movement controlled by the sliding engagement of pin 188 in slot 190. A coil spring 191 has one end engaging the thrust nut 186 and another end acting upon a shoulder portion 193 of shaft 21, with an opening in shoulder portion 193 sufficient to pass the threaded extension 180. In order to advance the tubular shaft 21 to the right as viewed in FIG. 13 the wheel handle 25, and shaft 27, are turned to cause the thrust nut 186 to push spring 191 to the right causing tubular shaft 21 to telescope out of housing 122. When gripper element 19 makes holding engagement with one end of an auger that has been positioned between gripper elements 19 and 45, the auger may be held with a certain amount of pre-load by further advancing the threaded portion 180 by an additional revolution so as to additionally compress the spring 191. Because a certain amount of relative axial movement is afforded by the engagement of pin 188 in slot 190, longitudinal thermal expansion of a hot auger may be accomodated while an axial compressive force is maintained on the auger.

The other end of tubular shaft 21 seats a brass bushing 195 which is secured by a pair of set screws 197 (one shown). The bore of bushing 195 holds an electrically insulative bushing 199 which is made of a material such as is available under the trademark NYLATRON. A pin 201 of NYLATRON material holds bushing 199 against rotation. A gripper mount 203 has shaft 205 which is rotatably received in the bore of insulative bushing 199 as shown in FIG. 13, such that its annular surface 207 shown in FIG. 14, can make rotating electrical contact with the annular surface 209 of brass bushing 195. Good contract is maintained by the action of a spring-loaded mechanism 213 which biases these annular surfaces into engagement with one another. The bolt 215 is received in the end of shaft 205 and is tightened to compress the coil spring 217 between washer 219 and thrust plate 221. It is preferred that the threads of bolt 215 be treated with a suitable bonding agent so that it is permanently affixed to shaft 205. FIG. 14 shows gripper element 19 secured to the gripper mount 203 by nut 221.

A conventional limit switch 36 slidingly engages rail 61 and can be clamped in position therealong by tightening knob 38. A trip lever 40 is aligned so it will make switch-activating contact with an edge 82 of the traveller 83. Switch 36 is connected to conventional means (not shown) for controlling the power supply for the drive motor 57 and the arc-welding unit (not shown).

Prior to operating the afore-described apparatus 11, the tailstock support 31 is slid along the main frame 13 and clamped into a position appropriate to accommodate the length of the work piece. The wheel handle 25 is turned to retract gripper element 19, and carriage assembly 81 is shifted to its raised position and latched therein. The work piece W may then be mounted, by one person if necessary, by first laying one end of the auger stem 34 upon the lip portion 46 of gripper element 45. The other end of stem 34 may then be axially aligned with gripper element 19 which is advanced into engagement with that end of stem 34 by rotating handle 25.

Continued advancement of element 19 will cause both ends of stem 34 to be completely seated in gripper elements 45 and 19, and held therein under a certain amount of spring-generated axial compression. Next the carriage assembly 81 is lowered into operating position with follower wheel 116 engaging flight F. By energizing motor 57 to turn in one direction and/or the reverse, work piece W is rotated so that the carriage assembly 81 is advanced or retracted until the tip of the wire electrode 123 is positioned adjacent the leading end of flight F. The knob 138 and lever 160 may then be manipulated to precisely center the wire electrode 123 relative to the edge of flight F.

The flight edge welding operation may then commence by energizing the welder power supply, and turning on the cover gas supply and the drive motor. This sets the work piece W into rotation in the direction indicated by arrow in FIG. 4 as a continuous bead 174 of weld material is deposited, the tip of electrode 123 being automatically maintained in alignment with the edge of flight F. The throwing of limit switch 36 will shut down the welding operation. It is noted that during the welding process, linear thermal expansion of auger stem 34 is allowed by the longitudinal travel that is taken up by the coil spring element within the tail stock assembly 23.

While a particular embodiment of the invention has been described herein it is not intended that the invention be limited thereto, since various modifications and changes may readily occur to those skilled in the art without departing from the invention. Therefore it is aimed to cover all such changes and modifications as fall within the true spirit and scope of the invention as defined in the claims which follow.

What is claimed is:

1. Welding apparatus for continuously applying a bead of weld material along the outer edge of a flight of an auger section, comprising:
   a. main support frame having attached thereto means for releasably supporting the opposite ends of said auger section and holding said section horizontally for rotation about its longitudinal axis;
   b. means mounted to said frame for driving said auger in rotation;
   c. guide rail attached to said frame and disposed above said auger section and extending in a direction parallel to said auger section axis;
   d. traveller mounted to said rail for horizontal movement therealong;
   e. carriage mounted to said traveller for guided free movement in a vertical direction;
   f. free-turning follower wheel having a grooved rim and mounted to said carriage, said rim adapted to receive the outer edge portion of said auger flight and said wheel engagable with an upper portion of said flight so as to vertically support said carriage and to vertically follow said flight edge, and said wheel cooperating with said flight edge portion when said auger section is rotated to propel said carriage and traveller in horizontal movement; and
   g. arc-welding means including a welding head adjustably mounted to said carriage and including a welding tip held in alignment with said flight edge when said carriage is supported on said flight.

2. Apparatus as defined in claim 1 wherein said means for supporting said auger section include first and second rotatable gripper elements for releasably holding opposite ends of said auger section and said first element being connected to said drive means.

3. Apparatus as defined in claim 2 wherein said second gripper element is rotatably mounted to means for holding said section with a spring-generated compressive force in the direction of said auger section axis.

4. Apparatus as defined in claim 2 wherein said first gripper element has a longitudinally extending lip portion for supporting an end of said auger section when said section is being mounted into said gripper elements, and for slidably guiding said auger section end into mounting position in said first gripper element.

5. Apparatus as defined in claim 1 wherein said means for supporting said auger section include first and second rotatable gripper elements for releasably holding opposite ends of said auger section and said second element is rotatably mounted to means for holding said section with a spring-generated compressive force in the direction of said auger axis, and for providing an electrically conductive path from said second gripper element to non-rotating portions of said holding means.

6. Apparatus as defined in claim 1 wherein said follower wheel engages said flight at a point near the top of said flight.

7. Apparatus as defined in claim 1 wherein said traveller is mounted to said rail by means of a plurality of spaced apart rolling members which engage top and bottom edges of said guide rail.

8. Apparatus as defined in claim 7 wherein said carriage has vertically extending, horizontally spaced-apart rails and said traveller has a plurality of rolling members which engage said carriage rails.

9. Apparatus as defined in claim 1 wherein said traveller includes a vertically extending plate having a first plurality of rolling members mounted to one side of said plate for engaging said guide rail, and having a second plurality of rolling members mounted to the other side of said plate for engaging said carriage.

10. Apparatus as defined in claim 1 wherein said follower wheel is mounted to means for adjusting its orientation relative to the angle of pitch of said flight.

11. Apparatus as defined in claim 1 wherein said traveller is slidably mounted to said guide rail.

12. Apparatus as defined in claim 1 wherein said carriage is slidably mounted to said traveller.

13. Apparatus as defined in claim 1 including limit switch means for sensing when said carriage has reached a predetermined location relative to said guide rail and for then deenergizing said drive and arc-welding means.

14. Apparatus as defined in claim 1 wherein said wheel cooperates with said flight edge to propel said carriage in one horizontal direction when said auger section is rotated in one direction, and to propel said carriage in the opposite horizontal direction when said auger is rotated in the opposite direction.

* * * * *